(12) United States Patent
Kirkland et al.

(10) Patent No.: US 7,041,623 B2
(45) Date of Patent: May 9, 2006

(54) POROUS SILICA MICROSPHERE SCAVENGERS

(75) Inventors: Joseph J. Kirkland, Wilmington, DE (US); Timothy J. Langlois, West Chester, PA (US); Ounjie Wang, Hockessin, DE (US)

(73) Assignee: Agilent Technologies, Inc., Palo Alto, CA (US)

( * ) Notice: Subject to any disclaimer, the term of this patent is extended or adjusted under 35 U.S.C. 154(b) by 826 days.

(21) Appl. No.: 10/278,517

(22) Filed: Oct. 23, 2002

(65) Prior Publication Data

US 2003/0136739 A1 Jul. 24, 2003

Related U.S. Application Data

(63) Continuation of application No. 10/035,901, filed on Dec. 26, 2001, now Pat. No. 6,482,324, which is a continuation of application No. 09/428,202, filed on Oct. 27, 1999, now abandoned.

(51) Int. Cl.
*B01J 20/00* (2006.01)
*C02E 1/28* (2006.01)

(52) U.S. Cl. ............... 502/439; 502/408; 502/407; 210/656; 210/198.2; 210/502.1; 427/220; 428/405

(58) Field of Classification Search ............... 210/656, 210/198.2, 502.1; 502/408, 407, 439; 427/220; 428/405
See application file for complete search history.

(56) References Cited

U.S. PATENT DOCUMENTS

| | | | |
|---|---|---|---|
| 4,105,426 A | 8/1978 | Ileret al. | |
| 4,804,686 A | 2/1989 | Regnier et al. | |
| 4,847,159 A | 7/1989 | Glaijch et al. | |
| 4,874,518 A | 10/1989 | Kirkland et al. | |
| 5,013,585 A | 5/1991 | Shimizu et al. | |
| 5,032,266 A | 7/1991 | Kirkland et al. | |
| 5,063,179 A | 11/1991 | Menashi et al. | |
| 5,087,671 A | 2/1992 | Loeppky et al. | |
| 5,108,595 A | 4/1992 | Kirkland et al. | |
| 5,230,806 A | 7/1993 | Fritz et al. | |
| 5,244,582 A | 9/1993 | Loeppky et al. | |
| 5,352,645 A | 10/1994 | Schwartz | |
| 5,681,789 A | 10/1997 | Saxton et al. | |
| 6,482,324 B1 * | 11/2002 | Kirkland et al. | 210/656 |

FOREIGN PATENT DOCUMENTS

| | | |
|---|---|---|
| EP | 0221780 A | 5/1987 |
| EP | 0227346 A | 7/1987 |
| EP | 0816309 A1 | 1/1998 |
| EP | 0818434 A1 | 1/1998 |
| EP | 0825164 A2 | 2/1998 |
| GB | 2001044 A | 1/1979 |
| GB | 1555230 | 11/1979 |
| GB | 1563739 | 3/1980 |
| GB | 2127002 A | 4/1984 |

OTHER PUBLICATIONS

Derwent abstract of JP 8157643.
Derwent abstract of JP 1230421.
Derwent abstract of JP 56026258.
Tetrahedron Letters, vol. 38, No. 19, pp. 3357–3369 (1997) Rapid Purification of Small Molecule Libraries by Ion Exchange Chromatography Siegle, et al.
Journal of the American Chemical Society 97:15, Jul. 23, 1975, "Probes for the study of Acylation Reactions", J. Rebek et al.

\* cited by examiner

*Primary Examiner*—Ana Fortuna

(57) ABSTRACT

Highly purified, porous silica microspheres contain functional groups which are capable of selectively binding to reaction impurities, such as excess reactant or reaction by-products, which are contained in a reaction medium. The reaction impurities can thereby be efficiently removed from the reaction medium, providing a convenient method for product purification.

8 Claims, No Drawings

US 7,041,623 B2

POROUS SILICA MICROSPHERE SCAVENGERS

RELATED APPLICATION(S)

This is a Continuation of U.S. patent application Ser. No. 10/035,901, filed on Dec. 26, 2001, now U.S. Pat. No. 6,482,324 which is a continuation of U.S. patent application Ser. No. 09/428,202, filed on Oct. 27, 1999, now abandoned both of which are incorporated herein in their entirety by reference.

BACKGROUND OF THE INVENTION

The present invention relates to modified porous silica microspheres used to selectively separate unreacted reactants from desired products and undesirable side products in a reaction medium, and to methods for using such microspheres.

The need to improve the efficiency of drug discovery and basic research efforts has led to faster and more convenient methods for synthesizing organic compounds. In the synthesis of organic compounds, reactants are combined under appropriate conditions to produce desired products. These products must then be purified by separation from other undesired products or unreacted reactants. Solid phase synthesis methods facilitate such purifications. In the solid phase synthesis approach, a reactant first is linked, usually covalently, to a solid support. A binding interaction between this support-anchored functional group and a solubilized reactant produces a product that is ionically or covalently linked to the functionalized solid support.

The solid phase synthesis methods have strong advantages over traditional solution synthesis methods. Unreacted reactants or by-products are easily removed from the products linked to the support by washing or filtering the support after the synthesis reaction. This approach allows a large excess of reactants to be used so that the desired reaction often can be rapidly driven to completion. In addition, the synthesis and separation of desired products from unreacted reagents or reaction by-products can be readily automated for the convenient and rapid synthesis of multiple compounds.

Modern drug discovery techniques are based on the use of combinatorial chemistry to generate large numbers of compounds that are often referred to as libraries. The objective of this approach is to generate lead compounds for pharmaceutical research. Preferred combinatorial chemistry approaches, usually automated, often involve parallel array synthesis where individual reaction products are generated as mixtures. Such library compounds may be contained in the individual wells of 96-well microtiter plates. The use of such standardized plates is advantageous because they can be manipulated automatically by robotic machines.

Combinatorial chemistry often is performed under conditions such that, after the reaction, unwanted unreacted reactants and possible side reaction materials must be removed so that the desired product can be recovered, hopefully in a purified form. For the removal of such materials, solid particles called "scavengers" often are used. These scavenger particles have traditionally consisted of porous polymeric or inorganic supports that have been functionalized with reactive groups that can readily react with the excess reactants or unwanted side products.

These functionalized reactive groups can be ionic in form, such as, for example, a sulfonic acid functional group used to remove excess basic amine reactants. An example of such ionic reactions is found in U.S. Pat. No. 3,576,870, which describes the purification of dimethylacetamide by removing excess acetic anhydride with a basic ion exchange resin containing primary or secondary amino groups.

Alternatively, the scavenger support can contain a reactive group that can covalently react with and remove a reactant, such as, for example, an isocyanate that can react with a primary amine. Other examples of a covalent scavenging reactions are found in U.S. Pat. Nos. 5,087,671 and 5,244,582, which describe the use of various reactive groups immobilized on inorganic substrates to remove carcinogenic nitrosating agents from liquids. The substrates disclosed in these patents include organic polymers and inorganic derivatized glass and silica, and the functional groups include pyrrole groups, indole groups and hydroquinone.

U.S. Pat. No. 5,767,238 describes a method for the inverse solid phase synthesis of a variety of organic compounds in the liquid phase. Unreacted reactants are removed from the reaction mixture and separated from the desired products using a solid phase support matrix which binds covalently or ionically to the reactants. The solid phase support matrix is a macromolecular structure which is insoluble in the reaction medium, and which can be a porous or non-porous structure. Suitable solid phase support structures include anion exchange resins, cation exchange resins and acrylic resins.

Scavenger-assisted combinatorial processes for preparing ureas or thioureas are described in the following European patent publications: EP 816309, which discloses the use of particles functionalized with amines for scavenging ureas, thioureas, and isothiocyanates; EP 818431, which discloses the use of particles functionalized with aldehyde groups for scavenging secondary amines; and EP 825164, which discloses the use of particles functionalized with amines for scavenging amides and carbamates. Suitable substrates disclosed in these patent applications include polystyrene divinylbenzene, cellulose, silica gel, alumina and controlled pore size glass.

Commercial scavenger materials based on polystyrene-divinylbenzene particles are available as scavengers for combinatorial synthesis reactions (e.g., Argonaut Technologies, San Carlos, CA). While such polymeric materials can be prepared with a variety of functionalities for scavenging, they have a distinct disadvantage: polymers absorb most organic solvents, causing them to swell significantly. As a result, the use of polystyrene-based polymers in many organic solvents causes polymeric scavengers to increase their volume two-fold or more, making their use quite difficult in certain applications, such as with 96well plates. Because of the strong swelling propensity, there are restraints on the amount of the polymer that can be used in the wells, limiting the capacity of the scavenging process. Furthermore, to be used properly, polymeric scavengers must be in a swollen state to effectively expose the bound functionality for the desired interactions. To adequately swell polystyrene-divinylbenzene-based scavenger particles, non-polar solvents such as methylene chloride generally must be used. Desirable polar reaction solvents such as methanol and N, N'-dimethylformamide, often needed for sample solubility, generally cannot be used with these polymeric scavengers. The handling properties of polystyrene-divinylbenzene particles is also poor (typically because of problems with static charge), making the loading inconvenient, particularly into small 96-wells plates.

U.S. Pat. No. 5,230,806 describes the use of functionalized polystyrene-divinyl benzene adsorbent resins in solid-phase extraction methods for removing organic solutes from solutions. In particular, the reference describes the use of neutral polystyrene-divinyl benzene resins containing functional hydroxymethyl, acetyl or cyanomethyl groups for removing or scavenging phenols from solutions. The use of neutral polymers is preferred since charged resins can pick up undesirable material present in the solution. The reference further states that silica containing a chemically-bonded organic group is not particularly suited for use in solid phase extractions since they are hydrophobic and do not make good surface contact, and many types of organics are incompletely extracted from aqueous solutions. See, also, Capillary Columns, *J. Am. Chem. Soc.*, 97, 15 (1975), which shows the use of an isocyanate bound to a cross-linked polystyrene for removing anhydrides and acids from a solution of pyridine.

U.S. Pat. Nos. 4,874,518, 5,032,266 and 5,108,595, relate to chromatographic materials comprising porous silica microspheres having silanol-enriched surfaces with favorable sorptive properties for separating organic compounds. The silica microspheres are formed by contacting microspheres which have been thermally-dehydroxylated with water in the presence of an activator, such as ammonium hydroxide, to generate a surface concentration of silanol groups. This procedure serves to maintain the activity of the microspheres, while providing the requisite crush resistance which enables the materials to be used at high pressures. These silica microspheres can be used in gel filtration and high speed size-exclusion chromatography.

The use of silica as a support for scavenger particles has also been reported in *Tetrahedron Letters*, Vol. 38, No. 19, pages 3357–3360 (1997), which describes the use of such particles in ion exchange chromatography for removing impurities resulting from the synthesis of amines and acylated amines. Materials of this type are also commercially available (e.g., Applied Separations, Allentown, PA). Such silica-based particles do not swell, and they can be used with a wide range of reaction solvents, both polar and nonpolar. However, existing silica-based scavenger materials are formed on irregular-shaped silica gels that contain a high level of impurities, such as aluminum and iron. As a result, these materials are strongly acidic and often incompatible with strongly basic molecules. Traditional silica-based materials also can catalyze or enable unwanted reactions or changes in the desired final product. Such acidic silica-based materials also can strongly absorb polar, especially basic, compounds, leading to reduced reaction yields.

It will be appreciated that a need exists for an improved silica-based scavenging reagents which are stable in a variety of solvent systems, and which avoid the swelling problems associated with polymeric substrates.

SUMMARY OF THE INVENTION

This invention relates to scavengers comprising highly purified, porous silica microspheres containing functional groups on the surface thereof. These silica-based scavenger particles are essentially non-swelling, and can be used with a large variety of organic or aqueous-organic solvent systems. The highly purified silica particles are close to pH neutral (pH of about 6–7), making the particles highly compatible with both basic and acidic compounds. The porous silica microsphere-based particles of this invention have a narrow particle size distribution and are free flowing for easy handling, a highly attractive characteristic for applications which use automatic instrumentation. The narrow pore size distribution of the particles provides for clearly defined and reproducible performance.

In one aspect, the present invention relates to highly purified, porous silica microspheres having surfaces modified to contain functional groups, and to methods for using the functionalized silica microspheres as scavenging reagents in organic synthesis reactions. The silica microspheres can be prepared by spray drying a silica sol formed by the hydrolysis/mixture of an organic silicate. The silica microspheres are heated to provide mechanical strength, and then hydroxylated to generate a high level of silanol groups on the surface of the microspheres. The silica microspheres are sized, purified, and the surface silanol groups are then reacted with an appropriate silanizing agent to achieve the requisite functionality.

In one embodiment of this aspect, the surface of the porous silica microsphere support is modified with a lightly polymerized silane coating containing functional groups that would react with organic compounds by ionic or covalent forces. In this embodiment, a hydroxylated silica support is reacted with a silane containing the functional group of interest in a non-aqueous environment, in the presence of a small amount of water, to produce a light polymerization of the silane reactants. Typical functional groups include monoamines, triamines, tertiary amines, sulfonic acids, sulfonyl chlorides, isocyanates, epoxides, diamines, diphenylphosphines, diethylphosphines, mercaptans, alkyl-bromo groups, and sulfonyl hydrazides.

Other methods for modifying the surface of the silica particles include reacting the particles with monofunctional silanes having either ionic or covalent reactivity in the absence of water, mechanically casting a polymeric film of the desired functionality onto the surface, and reacting the surface with a "non-silica" organic, covalently-attached polymeric phase that contains the necessary functionality.

In another aspect of this invention, a method is provided for performing scavenging reactions. The method comprises at least partially removing excess reagents or side reaction products from an organic synthesis reaction by using the silica-based scavengers as described herein. The reaction conditions, concentrations and reaction time are adjusted to provide at least some removal of these excess reagents or unwanted by-products, leaving the desired product in a more purified form. The silica microspheres of this invention can be used in beds, filter plates or cartridges for high throughput applications, such as for purifying libraries of chemical compounds in drug discovery applications.

DETAILED DESCRIPTION OF THE INVENTION

The highly purified, porous silica microspheres of this invention are prepared prior to the introduction of functional groups onto the surface of the particles. This can be accomplished using a variety of techniques, all of which are within the scope of the present invention. The particles are sintered, sized and purified, and silanol groups are introduced onto the surface of the microspheres for reaction with appropriate functional groups. The functional groups are introduced by, for instance, reacting the silanol groups with trifunctional or bifunctional silanes containing the functional group of interest. The functionalized particles can be used in a variety of applications, such as in cartridge, bed or filter plate format for high throughput combinatorial chemistry applications.

As used herein, the terms "silica support", "silica microspheres" and "silica particles" are essentially synonymous. These microspheres, which are generally spherical in shape, are typically sized to have nominal diameters in the range of from about 10 microns to about 200 microns. When used for its intended purpose, i.e., as a scavenger, the surfaces of the individual silica microspheres will be modified to contain appropriate functional groups.

The terms "highly purified" and "ultra pure" are intended to denote a silica support material having an impurity content of less than about 0.01%.

By "porous" is generally meant a porosity of at least about 50%, and preferably a porosity of from about 50% to about 65%. The degree of porosity refers to the total pore volume within the solid support. Porosity increases with increasing pore volume.

By "impurity" is meant an unreacted reactant, or excess reactant, or a reaction by-product, which is contained in a reaction mixture or a solution, but not including a desired product.

By "selectively" or "selectively removed" is meant that the silica support binds to the compounds to be removed from the reaction mixture, but does not substantially bind to the desired reaction products. The binding of compounds may be by ionic or covalent forces, or less likely, by selective adsorption or chelation. Preferably, the functionalized support structure will bind to less than about 10% of the desired reaction product, and most preferably less than about 5%.

The term "scavenging" is intended to denote the removal of impurities from the reaction mixture using the process of this invention, and the functionalized silica microspheres are the "scavenging reagents" or "scavenging agents."

The term "silanizing" is intended to denote a method of introducing functional groups onto the surface of the silica microspheres using procedures described more fully herein.

Silica Support

The silica support material of the present invention comprises highly purified porous silica microspheres. A preferred method of preparing these particles is by spraying drying silica solutions made by the controlled hydrolysis of tetraethyl-o-silicate or similar organic silicon compounds. This method allows the formation of highly purified porous silica microspheres at a relatively low cost and with highly controlled properties. The silica support can be made with different particle sizes and different pore sizes to match the requirements of a particular scavenging operation.

To prepare such silica supports, appropriate silica sols can be prepared by the hydrolysis of organic silicates in the manner described by Stöber et al., *J. Colloid and Interface Science*, 26, pages 62–69 (1968). This approach is known to make silica sols with a very high purity and with a narrow sol particle size distribution. The particle size of the sol prepared in this manner determines the pore size of the porous silica microspheres ultimately made from these sols, with the average pore size being about one-half the average diameter of the silica sol microparticles.

Porous silica microspheres can then be made from these aqueous colloidal silica sols by using well known spray-drying equipment and methods (K. Masters, *Spray Drying Handbook*, $5^{th}$ ed., Longman Scientific and Technical, New York (1991). In some cases, the silica solutions should first be flocculated or partially pre-gelled by using a process such as described in R. K. Iler, *The Chemistry of Silica*, Chapter 4, John Wiley, New York (1979), to produce microspheres with a porosity that is higher than that available by the direct spray drying of silica sols. The concentration of the silica solution, the type and rate of the spray-drying nebulization (for example, two-fluid nozzle or spinning disk), the drying temperature, the rate of heated air supply, and the like, are all adjusted to produce the porous silica microspheres of the desired size and size distribution.

These "raw" spray-dried particles with a rather wide particle size distribution then are fired to remove any residual organic contaminants, and sintered at an appropriately high temperature (typically 750° C.–800° C.) to give the particles good mechanical strength. Silica particles which are heated to such high temperatures have no surface silanol groups on which reactions with functionalized silanes can occur. Accordingly, the porous silica microsphere surface must be hydroxylated to produce a high population of silanol groups for functional silanization. Hydroxylation under either acidic or basic conditions may be used, for example, as described in U.S. Pat. No. 4,874,518, the pertinent disclosure of which is incorporated herein by reference.

Prior or subsequent to hydroxylation, the porous silica microspheres are sized to obtain the particle size fraction needed for scavenging reactions. The average particle size required varies with the particular scavenging application. For reactions in a simple vial or in a 96-well plate, particles in the 20 to 80 μm range are adequate. For flow-through reactions with automated equipment requiring rapid equilibration, particles in the 10 to 30 μm range may be required, although the driving force through the equipment must be increased for these smaller particles because of reduced permeability. Larger particles, up to 100 microns to 200 microns, may be useful in applications where reaction times, rate of equilibrium and bed permeability are not critical.

The particle sizing may be accomplished by a number of well-known methods, such as sieving, air classification, and liquid elutriation. Sieving is the simplest and least costly method. However, this method produces products that have the greatest concentration of fine particles, because of the tendency of fines to adhere to larger particles and therefore not be properly fractionated. Air classification with a relatively expensive machine is a convenient method that permits a high throughput of desired particles to be fractioned accurately in a narrow particle size distribution.

Unfortunately, in both the sieving and air classification approaches, it is not possible to maintain highly purified porous silica microspheres. Both of these particle fractionation methods contaminate particles with the metal used in the fractionation apparatus as a result of significant mechanical attrition. Therefore, in order to use these methods of particle fractionation to obtain highly purified porous silica microspheres, metal contaminants must be carefully removed. This can be accomplished by exhaustive extraction of the silica particles with strong metal-solubilizing acids, such as nitric and hydrochloric acids. Subsequent to acid-washing, the silica particles must be thoroughly washed to neutrality with water to eliminate residual acids, then dried for subsequent surface modification.

Another method of particle fractionation is the liquid elutriation method which can be performed in a manner similar to that described in C. D. Scott, *Anal. Biochem*, 24, 292 (1969). As with air classification, this method is based on the concepts of Stokes Law (S. Glasstone, *Testbook of Physical Chemistry*, $2^{nd}$ ed., D. Van Nostrand Co., New York, page 258 (1946), and again allows particles to be fractionated into narrow size ranges. While the liquid elutriation method with water as the mobile phase is slow and costly, it does allow particles to be fractioned without metal contamination, since all glass and plastic apparatus can be used.

An alternative method for preparing highly purified porous silica microspheres is described in European Patent Application No. 298062. This method involves emulsifying a highly purified silica sol with an organic solvent immiscible with water in the presence of au surface active agent. The sol drops formed are then gelled by removing water under controlled temperature and pH conditions. The formed silica particles are heat treated to remove all organic material. The particles may be sized and rehydroxylated, if needed, to produce surface silanol groups for subsequent surface modification.

Another alternative method (as described in DE 3534143) for preparing highly purified porous silica microsphere supports involves the emulsification of organic alkoxysilicon compounds with an organic solvent immiscible with water in the presence of a surface active agent. The pH of the mixture is lowered so that the alkoxysilicon compound is hydrolyzed to silicic acid which then polymerizes to form silica-containing droplets. The formed particles are isolated and heat treated to remove organic material. The particles can then be sized and rehydroxylated if needed for subsequent surface reaction.

Another alternative method for preparing highly purified porous silica microsphere supports involves the spray drying of fumed silica, such as the fumed silica material available commercially from Degussa (Aerosil 380 amorphous fumed silicon dioxide, Degussa Corp., Ridgefield Park, New Jersey). Fumed silica is prepared by the conversion of purified silicon tetrachloride, leaving highly purified silica in a high surface area form. This silica can be converted into highly purified porous silica microspheres by a spray-drying method similar to that described in Example 1. These silica microspheres are processed by sintering, rehydroxylation, and sizing, in the same manner as described for other silica support preparation methods discussed above, to yield a material suitable as a support for the silica-based scavenger products and methods of this invention.

Still another method for preparing porous silica microspheres for use in the practice of this invention involves the coacervation of highly purified silica sols, such as those prepared by the Stöber method referenced above. The method described by Köhler and Kirkland (U.S. Pat. No. 4,874,518) uses the formation of a urea-formaldehyde polymer to aggregate silica sol particles into a spherical mass. These particles are heat treated to remove the organic polymer and improve particle strength. If surface modification is to be accomplished by reaction with silanes, the particles then are appropriately rehydroxylated. Rigorous sizing generally is not needed, since this coacervation method inherently produces n narrow particle size distribution. The coacervation method generally is less useful for producing porous silica microspheres for scavenger supports since it is difficult to prepare particles sizes above about 25 μm by this method.

Table I lists the physical properties of two different types of porous silica microspheres prepared as supports for use as scavenger particles according to this invention. One batch of particles is made from a fumed silica, while the other batch is made from a colloidal silica sol. Both preparations are made by a two-fluid-nozzle spray drying method.

TABLE I

Physical Properties of Materials Derived from Different Starting Silica

| Starting Material of Particles | Fumed Silica | Colloidal Silica |
|---|---|---|
| Surface Area (m2/g) | 235 | 225 |
| Pore Volume (%) | 64 | 52 |
| Median Pore Diameter (Angstroms) | 110 | 66 |
| (Data obtained from Mercury Intrusion/Extrusion) | | |
| Average Pore Diameter (Angstroms) | 256 | 90 |
| (Data obtained from BET/BJH Nitrogen Isotherm Absorption) | | |
| Density of Particles (g/cc) | 1.38 | 1.58 |

Of considerable significance in the materials of this invention is the purity of the silica used to prepare the silica-based scavengers. A highly purified silica support is required to ensure a high yield and excellent reproducibility in preparing purified products resulting from scavenging processes. As shown in Table II, the purity of the silica-based products of this invention far exceeds those of ordinary silica-based materials.

TABLE II

Comparative Analyses for Contaminating Elements in Silica-based Scavengers

| Element[1] | This invention, ppm | Another Source[2], ppm |
|---|---|---|
| Aluminum | n.d.[3] | 378 |
| Barium | n.d. | 23 |
| Calcium | n.d. | 30 |
| Iron | n.d. | 32 |
| Magnesium | n.d. | 18 |
| Sodium | n.d. | 93 |
| Titanium | n.d. | 171 |
| Zirconium | n.d. | 30 |

[1]Determined by inductively-coupled plasma optical emission spectroscopy
[2]Applied Separations, Allentown, PA, USA
[3]Limit of detection, 6–12 ppm, depending on element The silica used for the materials of this invention has an overall purity of about 99.99%.

Surface Modification of the Support

Although unmodified silica particles have applications in limited situations, scavenger reactions usually require particle surfaces that have been modified with various organic functionalities needed for reactions with certain reagents. There are several methods which can be used to modify the surface of the silica support particles for use in a broad range of scavenging reactions.

A preferred method for surface modification is to alter the silica surface with lightly polymerized silane groups. This approach requires that the silica support be hydroxylated so that a high population of surface groups are available for reaction as scavenging reagents. Trifunctional or bifunctional silanes, or a mixture of these silanes, containing the functional group of interest, are then reacted with the silica particles surface, usually at elevated temperatures in a solvent such as toluene, as described in W. R. Melander and C. Horvath, *High-Performance Liquid Chromatography*, Vol. 2, Academic Press, New York, page 113 (1980). Using this method, a small amount of water can be added to the silica before reaction, to facilitate a light polymerization of the silane reactants during attachment to the silica surface and subsequent heating. Alkoxysilanes and chlorosilanes can be used for these reactions because of their ready availability and lower cost.

After an appropriate reaction time (e.g., overnight, or 24 hours), the reacted particles are isolated, washed exhaustively with organic solvents and dried. Elemental analysis, as well as other measurements such as titrations, can be used to determine the concentration of silane ligands on the silica support surface. For example, surfaces with highly acidic sulfonic acid groups can be titrated with standardized basic solutions to determine the concentration of sulfonic acid groups on the particles.

Table III gives a list of illustrative products that can be produced by this method, although this list is not intended to be limiting in terms of the type of structures that can be produced by those knowledgeable in the field.

TABLE III

Illustrative Functional Groups for Silica Microspheres

| Name | Functional Group |
|---|---|
| Monoamine | $SiO_2(CH_2)_3NH_2$ |
| Triamine | $SiO_2(CH_2)_3NH(CH_2)_3NH(CH_2)_2NH_2$ |
| Tertiary Amine | $SiO_2(CH_2)_3N(CH_3)_2$ |
| Sulfonic Acid | $SiO_2(CH_2)_2-(CH_2)_6-SO_3H$ |
| Sulfonyl Chloride | $SiO_2(CH_2)_2-(CH_2)_6-SO_2Cl$ |
| Isocyanate | $SiO_2-(CH_2)_3-NCO$ |
| Epoxide | $SiO_2-(CH_2)_3-O\ CH_2-CHOCH_2$ |
| Diamine | $SiO_2-(CH_2)_3NH(CH_2)_2NH_2$ |
| Diphenylphosphine | $SiO_2-(CH_2)_2P-((CH_2)_6)_2$ |
| Diethylphosphine | $SiO_2-(CH_2)_2P-((CH_2)_2)_2$ |
| Mercaptan | $SiO_2-(CH_2)_3-SH$ |
| Alkylbromo | $SiO_2-(CH_2)_3-Br$ |
| Sulfonyl Hydrazide | $SiO_2-SO_2NHNH_2$ |

Alternatively, the silica support surface can be modified with monofunctional silanes in the manner described in J. J. Kirkland, *Chromatographia*, 8, page 661 (1975). While generally more expensive, this reaction approach produces surfaces with the highest degree of reproducibility. The reactions usually are carried out in a similar manner as for the surfaces created by reaction with tri-or bi-functional silanes, although water usually is not added to the silica surface before reaction. The amount of ligands that are attached to the silica support surface again is determined by elemental analysis and other more specific measurements, just as for the particles modified with tri- and bifunctional silane agents.

Another approach for preparing functionalized materials of this invention involves the controlled synthesis of polymer brushes with the desired functionality by "living" free radical polymerization techniques such as those described in *Macromolecules* 1998, 32, 592; 1998, 31, 602; 1999, 32, 1424–1431. For example, a preformed monochlorosilyl or alkoxy silyl functionalized azo initiator can be synthesized and covalently attached to the silica support surface. Using free radical polymerization conditions, linear chains containing the desired functional groups are then grown from the surface to give attached polymer brushes with high graft densities. An example of this approach is first covalently coupling triethoxyallylsilane or tricholoroallysilane to the silica support surface. This material then is reacted with allylamine using an azo catalyst to produce a polymer layer with primary amino scavenging groups.

Alternatively, a "living" free radical polymerization system containing alkoxyamine or haloester initiating groups can be used to prepare functionalized silica products. This approach has the advantage that the polymerization process can be better controlled. An additional benefit of this approach is the ability to prepare block polymers by the sequential activation of the dormant end chain in the presence of different monomers containing the functional group needed for scavenging.

Another method for preparing silica-based scavengers is to mechanically cast a film of polymer with the desired scavenging functionality onto the surface of the silica support. An example of this method is the casting of a 0.25∥m film of polyethyleneimine onto silica support particles by the rotary evaporation of a tetrahydrofuran solution of polymer until the particles are dry and free flowing. The resulting particles are then mildly heated to eliminate traces of remaining solvent. Many other types of polymeric materials may be used with this method. For example, a scavenger with a strong sulfonic acid group can be produced by evaporating an ethanolic solution of lower weight Nafion® polymer (DuPont, Wilmington, Delaware) onto the silica surface.

Silica-based Scavenger Product

The scavenger particles of this invention provide a convenient means of working up and purifying chemical reactions without the need for other more complicated separation methods. Scavenger particles are added after the reaction is complete to quench reactions by selectively reacting with excess reagents and/or reaction byproducts. These selective reactions by scavengers can be accomplished by covalent or ionic interactions, or in some cases, by selective chelation or adsorption. The resulting particle-bound reactants (or byproducts) are removed by simple filtration or centrifugation.

Properly-designed scavenger particles often perform similarly to small molecule solution reactions, with minimum effort needed to optimize for a particular organic reaction. Scavengers may be used individually or in a mixed mode to simplify reaction workups and eliminate other tedious separation methods such as extractions and chromatography. Scavengers also can be used to purify cleaved products from solid-phase reactions.

The silica-based scavenger particles of this invention have unique properties for performing the functions needed in combinatorial reactions, and other methods involving high-throughput, high-yield, high-purity reaction chemistry. Silica-based scavengers can be used with virtually any solvent for reactions, both organic and aqueous. The particles do not swell in the presence of solvents. As a result, silica-based scavengers show outstanding advantages compared to conventional organic resin-based scavengers which must be swollen before they are effective. In addition, the gross swelling properties of resin-based scavengers often makes the use of these materials difficult with certain solvents and reactions in the 96-well plates widely used in combinatorial chemistry.

Other advantages of the porous silica microsphere scavengers of this invention are associated with the higher density and the free flowing properties of the particles, which makes their handling convenient and precise. The high density of the particles (~1.3 g/ee to 1.5 g/ee) enhances their utility especially in combinatorial chemistry applications. They are easily loaded into micro reaction vessels, either manually or by automatic instrumentation. Compared with resin-based scavenger particles (density of <1 g/ee), the higher particle density of the porous silica microsphere-based particles often permits much easier filtration or centrifugation for removing the purified product from the particle-attached reactant or byproducts. In reactions, the silica-based particles are typically heavier than the solvents and reactants, allowing for convenient and precise reactions.

The porous silica microsphere particles of this invention are regular in shape, very strong and have no fines that can block filters or contaminate products that have been purified. Contrary to problems associated with resin-based scavengers, the silica-based scavengers of this invention do not "bleed" to leave organic polymeric contaminants in purified reaction products. Therefore, the particles of this invention allow the synthesis of high-purity products without the contaminants that often are associated with traditional polymeric scavenging materials.

Another practical advantage of the materials of this invention is that the porous silica microsphere scavenger particles can be readily prepared with easily controlled and reproducible particle size, pore size, porosity and functional loading properties. Sample loading properties for the silica-based scavengers of this invention on a volume basis (mmol/cc) are generally comparable with those commonly available with resin-based scavengers, taking into account the significant density difference between the two materials.

A wide variety of functional groups can be formed on the porous silica scavengers of this invention. Table IV gives illustrations of some of the functionalized materials that can be synthesized. The data in Table IV shows the loading capacity of these preparations based on elemental analysis and either aqueous or non-aqueous titrations of the actual functionality of interest.

sol, the mixture pH was adjusted to 5.0 with nitric acid and aged for 5 days at ambient temperature. The flocculent then was re- suspended by the addition of ammonium hydroxide, to adjust to a pH of 8.25 with mechanical mixing. The viscosity of the resulting slurry was 10 cp.

The resulting flocculated silica sol slurry then was spray dried with a custom built Bayliss Spray Drier (Randallstown, MD) using a two-phase internal atomizing nozzle. The silica sol slurry was pumped into the spray drier nozzle at a rate of 143 mL/min, and the time required for spraying the slurry was 61 min. The atomized particles were sprayed into a co-current inlet air at 240° C., and dried particles collected in a cyclone separator which discharged particles into a containment vessel. The process produced a

TABLE IV

Illustrative Silica-Based Scavengers

| Name | Functional Group | Elemental Analysis | Titration | Application |
|------|------------------|--------------------|-----------|-------------|
| Monoamine | $SiO_2(CH_2)_3NH_2$ | % N - 0.8–1.0 mmol/g<br>% C - 0.9–1.2 mmol/g | 0.6–0.95 mmol/g<br>(non-aqueous) | 99% Scavenged-4-$Cl(CH_2)_6$—COCl<br>—$(CH_2)_6$—OCOCl<br>—$(CH_2)_6$—NCO<br>—$(ClCH_2CO)_2O$ |
| Triamine | $SiO_2(CH_2)_3NH(CH_2)_2NH(CH_2)_2NH_2$ | % N - 0.5–0.7 mmol/g<br>% C - 0.6–0.8 mmol/g | 0.4–0.6 mmol/g<br>(non-aqueous) | Same as above and<br>Used in reaction to obtain the following<br>4-$Cl(CH_2)_6CO$—$NHCH_2(CH_2)_6$ |
| Tertiary Amine | $SiO_2(CH_2)_3N(CH_3)_2$ | % N - 0.75–0.85 mmol/g<br>% C - 0.8–0.9 mmol/g | 0.6–0.8 mmol/g<br>(non-aqueous) | Used in reaction to obtain the following<br>4-$Cl(CH_2)_6$—CO—$NHCH_2(CH_2)_6$ |
| Sulfonic Acid | $SiO_2(CH_2)_2$—$(CH_2)_6$—$SO_3H$ | % C - 0.5–0.8 mmol/g<br>% S - 0.6–1.0 mmol/g | 0.2–0.6 mmol/g<br>(aqueous) | |
| Sulfonyl Chloride | $SiO_2(CH_2)_2$—$(CH_2)_6$—$SO_2Cl$ | % C - 0.5–0.9 mmol/g<br>% S - 0.6–1.1 mmol/g<br>% Cl - 0.3–0.5 mmol/g | 0.98 mmol/g<br>(non-aqueous) | |
| Isocyanate | $SiO_2$—$(CH_2)_3$—NCO | % C - 0.6–1.0 mmol/g<br>% N - 0.6–1.0 mmol/g | 0.2–0.6 mmol/g<br>(non-aqueous) | |
| Expoxide | $SiO_2$—$(CH_2)_3$—$OCH_2$—$CHOCH_2$ | % C - 0.8–1.3 mmol/g | 0.45–0.7 mmol/g<br>(HBr titration) | Reaction with Benzylamine<br>Octylamine<br>(0.1–0.3 mmol/g) |
| Diamine | $SiO_2$—$(CH_2)_3NH(CH_2)_2NH_2$ | % C - 1.0–2.0 mmol/g<br>% N - 1.0–2.0 | mmol/g | |
| Diphenylphosphine | $SiO_2$—$(CH_2)_2P$—$((CH_2)_6)_2$ | % C - 0.5–0.9 mmol/g<br>% P - 0.5–0.8 | mmol/g | Reaction with $CH_3I$ |
| Diethylphosphine | $SiO_2$—$(CH_2)_2P$—$((CH_2)_2)_2$ | % C - 1.0–1.5 mmol/g<br>% P - 0.5–1.0 mmol/g | | |
| Mercaptan | $SiO_2$—$(CH_2)_3$—SH | % C - 2.1 mmol/g<br>% H - 2.2 mmol/g<br>% S - 1.9 mmol/g | | Reaction w/$(CH_2)_6$—$CH_2Br$<br>$(CH_2)_8$—Br<br>2-Bromobutane<br>95–100% removal of the components |
| Bromo | $SiO_2$—$(CH_2)_3$—Br | | | |
| Sulfonyl Hydrazide | $SiO_2$—$SO_2NHNH_2$ | | | |

EXAMPLE 1

Preparation of Highly Purified Porous Silica Microspheres

To 160 kg of deionized water was added 425 kg of 190 proof denatured ethanol (Equistar Chemicals, Houston, Texas), 103.6 kg of tetraethyl-o-silicate (Silbond Corporation, Weston, Michigan), and 1.64 kg of 28.0–30.0% ammonium hydroxide. The reaction was carried out at room temperature for 24 hours, then the ethanol was azeotroped off by distillation until only water remained. The resulting silica sol contained 13.03% by weight of silica with a sol particle size of 7 nm. The silica sol was adjusted using ammonium hydroxide to pH 8.8 at 22°C. for storage without gellation, and 200 g. of 37% formaldehyde (J. T. Baker, Phillipsburg, NJ) was added to retard bacterial growth during storage.

Into a 20 L container was added 10 kg of the silica sol, and the mixture was heated to reflux for 24 hours. After cooling the mixture to room temperature, the pH was then adjusted to 8.6 with ammonium hydroxide. To flocculate the silica yield of 96% based on silica weight, or 1.23 kg of white powder. The resulting particles then were strengthened by heating at 775° C. for 2 hr, resulting in a yield of 91 % with 1.12 kg of material.

Particles next were slurried in deionized water and classified by liquid elutriation at a flow rate of 600 mL/min using five consecutive elutriation vessels of 10.2, 10.2, 10.2, 17.8, and 22.9 cm internal diameter, respectively. After nine hours, the material in the fourth vessel was collected and air dried by first washing with c.p. acetone. The 30–63 µm particle size distribution was verified with a Coulter Multisizer particle size analyzer (Beckman Coulter, Fullerton, CA) and by optical microscopy. Final yield of this fraction was 428 g. of silica, or 38.2%.

To rehydroxylate the silica for subsequent reaction, the silica particles were placed in 4.27 L of 200 ppm hydrofluoric acid (48.0–51.0%, J. T. Baker, Phillipsburg, NJ), gently refluxed for 24 hr, and processed in the same manner as described in Example 5 of U.S. Pat. No. 4,874,518, the pertinent disclosure of which is incorporated herein by reference. The rehydroxylnted silica again was elutriated in the manner described above to produce a dry-weight yield of 91.6%. The resulting 392 g. of silica had a B.E.T. surface area of $219 m^2/g$ and showed a particle size that was 90% greater than 41.9 μm and 90% less than 62.6 μm.

EXAMPLE 2

Preparation of Functionalized Porous Silica Microspheres

Fifty grains of the particles from Example 1 were placed in a round-bottom flask and 350 mL of toluene was added to the silica. The mixture was heated to reflux, and water was removed by azeotropic distillation to a constant distillation-head temperature. The mixture was cooled to about 80° C. and 0.75 ml, of deionized water was added with stirring. To the reaction flask then was added 20.5 mL of 3-aminopropyltriethoxysilane (Aldrich Chemical Co., Milwaukee, WI), and with stirring the resulting mixture was gently refluxed for 16 hr. The reacted particles were filtered off on a medium porosity sintered glass filter, and washed with toluene, tetrahydrofuran, water and acetone, in that order, before drying in a vacuum oven for one hour at 110°C. The resulting material showed an organic functional group loading of 1.1 mmol/g based on elemental carbon analysis, and 0.80 mmol/g based on non-aqueous titration with standardized perchloric acid in glacial acetic acid solvent.

EXAMPLE 3

Mixed-Phase Scavenging of Reactants From a Reaction Mixture

The purpose of this test was to demonstrate the scavenging of excess reagent and acidic byproduct by using a sequential mixed-phase scavenging system.

In a 10 mL vial was mixed 2.0 mL of methylene chloride with 1.5 g of 1.2 mmol/g $SiO_2$ $(CH_2)_3$–$N(CH_3)_2$ tertiary amine silica-based scavenger and 0.4 mmol of benzylamine (Aldrich Chemicals, Milwaukee, WI) at room temperature. To this was added 0.08 mL, 0.6 mmol of p-chlorobenzoylchloride (Aldrich Chemicals) with magnetic stirring. The reaction was carried out for one hour at room temperature to form the desired substituted amide:

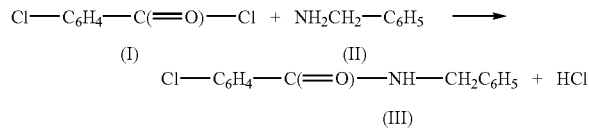

During this reaction the tertiary amine scavenger reacted only with the hydrochloric acid by-product to assist in driving the reaction to completion. After this reaction period, 0.4g., 0.6 mmol of silica-based triamine scavenging agent was added to the mixture to react with unreacted p-chlorobenzoylchloride (I) reagent. After one hour the mixture was diluted with acetonitrile and analyzed by GC-MS. Only the desired amide (III) was seen in the chromatogram (plus decane added with the methylene chloride as an internal standard for quantitation); no starting material (1) was evident The solvent from this mixture was evaporated to dryness, yielding 0.88 g. of colorless crystalline solid characterized as (III) by mass spectrometry and infrared spectroscopy. The yield was 95% by weight.

The patents, published patent applications and other publications referred to herein are hereby incorporated by reference to the extent that such patents and publications are deemed essential material which is necessary to support the disclosure.

What is claimed is:

1. A method for the preparation of porous silica microspheres comprising the steps of
    atomizing a flocculated silica sol slurry;
    drying said atomized silica;
    hydroxylating said atomized silica with a strong acid; and
    treating said hydroxylated silica with a reactive silane, such that said treated silica has nominal diameters in a range of from about 10 microns to about 200 microns.

2. The method of claim 1, wherein said silica microspheres are hydroxylated to create surface silanol groups that react with a silane containing functional group.

3. The method of claim 1, wherein the silica microspheres have a density of at least about 1.2 grams/cc.

4. The method of claim 1, wherein the atomized silica sol is prepared from a silica sol prepared from the controlled hydrolysis of an organic silicon compound.

5. The method of claim 1, wherein said flocculated silica sol is prepared from fumed silica.

6. The method of claim 4, wherein said organic silicon compound is tetraethyl-o-silicate.

7. The method of claim 1, wherein said treated silica is sintered.

8. The method of claim 1, wherein said reactive silanes contain functional groups comprising monoamines, triamines, tertiary amines, sulfonic acid, sulfonyl chloride, isocyanates, epoxides, diamines, diphenylphosphines, diethylphosphine, mercaptans, alkylbromo or sulfonyl hydrazine.

* * * * *